United States Patent [19]
Underwood et al.

[11] Patent Number: 5,775,991
[45] Date of Patent: Jul. 7, 1998

[54] HOUR GLASS SHAPE DISCHARGE BEATER

[75] Inventors: Mark Ray Underwood, Burr Oak; Sushil V. Dwyer, Arkansas City, both of Kans.

[73] Assignee: Deere & Company, Moline, Ill.

[21] Appl. No.: 755,107

[22] Filed: Nov. 22, 1996

[51] Int. Cl.⁶ .................... A01D 43/00; A01F 12/40
[52] U.S. Cl. .................... 460/111; 460/113; 460/142
[58] Field of Search ...................... 460/113, 73, 75, 460/76, 82, 142, 111, 108

[56] References Cited

U.S. PATENT DOCUMENTS

| | | | |
|---|---|---|---|
| 2,050,631 | 8/1936 | Schlayer | 460/113 X |
| 5,499,948 | 3/1996 | Underwood | 460/119 |
| 5,676,598 | 10/1997 | Ackley, II et al. | 460/113 X |

*Primary Examiner*—Terry Lee Melius
*Attorney, Agent, or Firm*—James E. Bradley

[57] ABSTRACT

A straw discharge assembly allows the beater to reach further towards the rotational axis of the threshing rotor, thus enabling it to remove a greater percentage of the straw which otherwise collects on the housing frame members. The beater has a barrel-shaped body, but it takes on an hourglass shape as it is divided into a center section with shorter blades and two side sections with longer blades, giving the center section a smaller effective diameter than the two side sections. The beater does not interfere with the rotational path of the rotor housing frame even though it is effectively closer to the housing frame. With their longer blades, the side sections are closer to the rotating frame legs and can therefore pull down and discharge more of the obstructed straw. The discharge grate is conformed to the effective shape of the rotor in a similar fashion.

8 Claims, 3 Drawing Sheets

HOUR GLASS SHAPE DISCHARGE BEATER

TECHNICAL FIELD

This invention relates generally to grain combines and more particularly to an improved system for discharging straw from the threshing section of a grain combine.

BACKGROUND ART

The threshing section of one type of grain combine such as the one shown in U.S. Pat. No. 5,499,948 has two elements that rotate about a single axis: the threshing rotor and the rotor housing. Both of these elements are supported on their rearward ends by bearings which rotate about the same axis. The rotor housing is attached to a rearward bearing with a rotor housing frame. The rotor housing frame comprises a small number of elongate members or legs which reach conically from the rotor housing bearing to the body of the rotor housing. The legs of the frame are spaced apart so that straw and other crop material may pass through the end of the threshing section mostly unobstructed.

The straw is then passed into a beater. The beater comprises a rotor which is perpendicular to the axis of the rotor housing. The rotor has blades which pull the straw into the beater. The straw passes between the beater and a grate, which is located below the beater, before it is expelled out of the combine. Additional grain threshed by the beater passes downward and through the grate.

One problem with this type of combine thresher design has been the partial obstruction of straw by the legs of the rotor housing frame. The beater is unable to remove some of the obstructed straw from the discharge assembly because it is beyond the reach of the blades of the rotor. The respective rotational, perpendicular axes of the threshing rotor and the beater are transverse to each other, thereby limiting the proximity of the components to one another. Even when the rotor is positioned as close to the rotating housing frame as possible without interfering with the rotating legs of the housing frame, some of the obstructed straw remains beyond the reach of the rotor.

DISCLOSURE OF INVENTION

The crop discharge assembly of the present invention is an improvement over the prior art as it allows the rotor to reach further towards the rotational axis of the rotor housing, thus enabling it to remove a greater percentage of the straw which otherwise collects on the housing frame members. The rotor has a conventional barrel-shaped body, but it takes on a general hourglass shape as it is divided into a center section with shorter blades and two outer sections with longer blades. Consequently, the center section has a smaller effective diameter than the two outer sections. In this configuration, the rotor does not interfere with the rotational path of the rotor housing frame even though it is effectively closer to the housing frame than in the prior art. With their longer blades, the outer sections are closer to the rotating frame legs and can therefore pull down and discharge more of the obstructed straw. This invention also improves upon the prior art by contouring the beater grate to the effective shape of the rotor. Forming the beater grate in this manner increases the efficiency of the discharge assembly as it allows the center section of the rotor to discharge straw and crop as readily as the two outer sections.

BEST MODE FOR CARRYING OUT THE INVENTION

Figure 1:
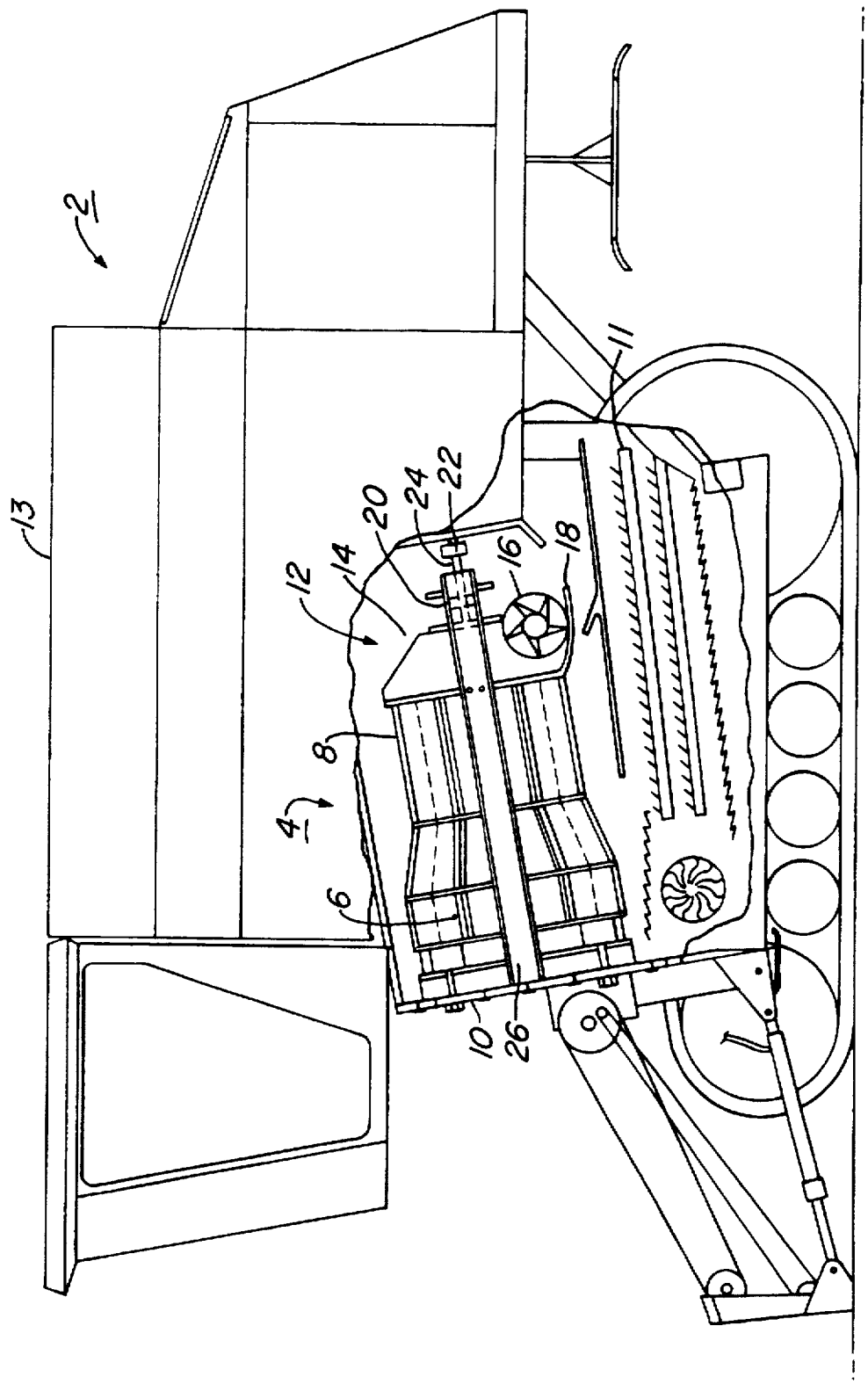
FIG. 1 is a schematic drawing of a grain combine showing the relative position of the elements of the invention with respect to the combine.

Referring to FIG. 1, a grain combine 2 with a threshing section 4 is shown. Threshing section 4 has a perforated rotor housing 8 which contains a threshing rotor 6. Both threshing rotor 6 and rotor housing 8 rotate, with rotor housing 8 rotating at a slower rate but in the same direction. Mounted at the forward end of threshing section 4 is a front plate 10, through which an opening (not shown) is formed for receiving crop to be threshed. As the crop moves into threshing section 4, it fills an annular space which is formed between threshing rotor 6 and rotor housing 8. Grain falls through the perforations in rotor housing 8 and onto sieves 11 for separating the grain from the chaff. The grain is then conveyed into a bin 13. The crop material remaining in rotor housing 8 passes to the rearward end of rotor housing 8. Beater assembly 12, which comprises a hood 14, a beater rotor 16 and a grate 18, is located at the rearward end of threshing section 4. Two side arms 26 extend laterally alongside threshing section 4 and are attached to front plate 10 at a forward end and to hood 14 at a rearward end. Side arms 26 enhance the structural integrity of threshing section 4. The rearward ends of both threshing rotor 6 and rotor housing 8 rotate about rearward hub 24 on bearing 22 and bearing 20, respectively.

Figure 2:
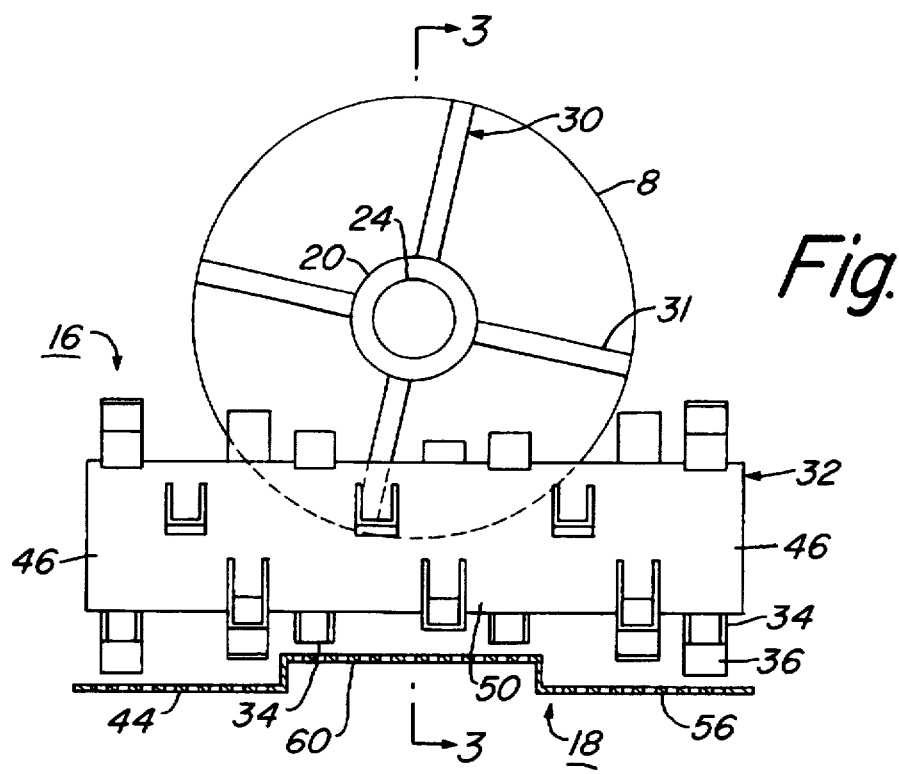
FIG. 2 is a partial rear view of the discharge assembly depicted in FIG. 1 showing the rearward end of the rotor housing, the housing frame, the rotor and the discharge grate.

Referring to FIG. 2, rotor housing bearing 20 and housing frame 30 support rotor housing 8 on rearward hub 24. Rotor 16 and grate 18 are located below rotor housing bearing 20. Rotor 16 rotates above stationary grate 18 and is wider than rotor housing 8. Rotor 16 comprises a barrel-shaped rotor body 32 with three approximately equivalent sections, a plurality of lugs 34 extending from rotor body 32, and lug blades 36. One lug blade 36 is mounted to each lug 34. The lugs 34 located in a center section 50 of rotor 16 either have a shorter lug blade 36, or do not have a lug blade 36 attached to them. In such a configuration, center section 50 has a smaller effective outer diameter or surface of revolution than the two outer sections 46.

Figure 4:
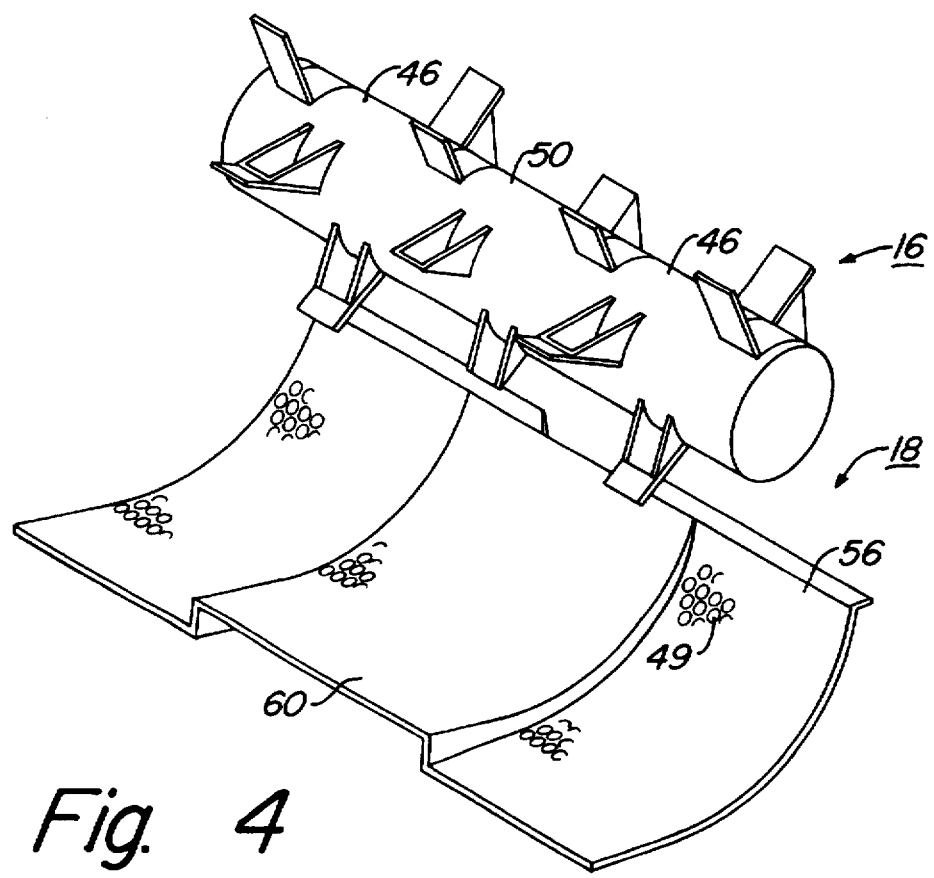
FIG. 4 is an exploded isometric view of the rotor and the discharge grate.

Referring to FIGS. 2 and 4, grate 18 is contoured to match the effective shape or surface of revolution of rotor 16. Grate 18, like rotor 16, has three cylindrical sections: a central section 60 and two outer sections 56. Central section 60 is higher than outer sections 56 and thus closer to rotor 16 since central section 50 of rotor 16 has no blades 36. Outer sections 56 are lower than central section 60 and, thus, farther away from rotor 16 to compensate for the length of blades 36 on sections 46 of rotor 16. The clearance between rotor 16 and grate 18 is substantially the same for all three sections. After straw is pulled down by lugs 34 on central section 50 and blades 36 on outer sections 46, it passes between sections 60 and 56 on grate 18 and rotor 16 before being expelled out of beater assembly 12. Grate 18 also has grate holes 49 for any residual grain in the discharge crop to fall through.

Figure 3:
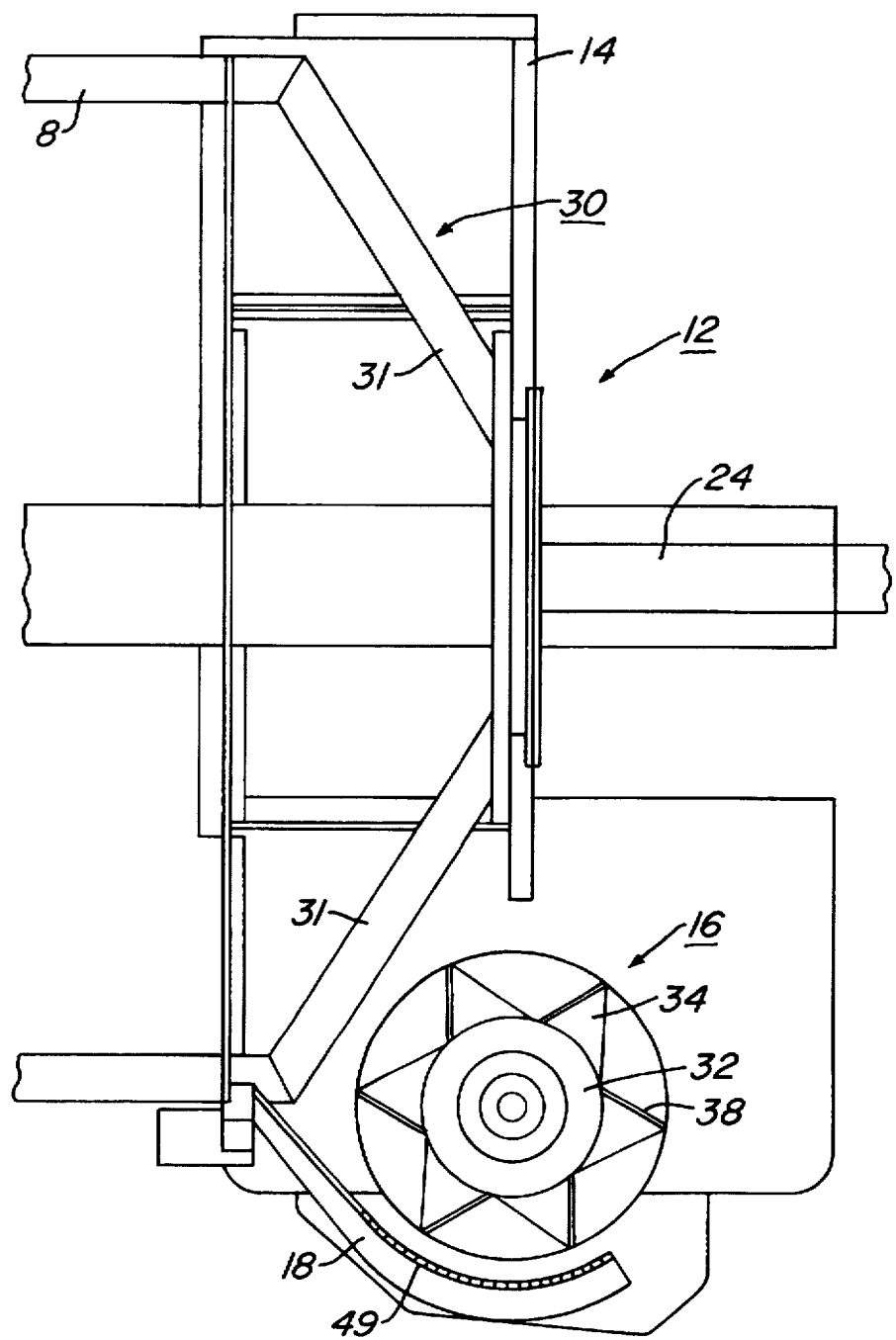
FIG. 3 is a partial sectional side view of the discharge assembly of FIG. 2 taken along the line 3—3.

FIG. 3 is an enlarged side view of the rearward section of beater 12. In this figure, only center section 50 of rotor 16 is shown. Hood 14 of beater 12 has three openings. One opening of hood 14 faces forward and generally conforms to the outer diameter of rotor housing 8. The second opening of hood 14 faces downward and is covered by grate 18. The third opening of hood 14 faces in a rearward direction and allows rotor hub 24 to protrude from beater 12.

In operation, threshing crop enters the forward end of threshing section 4 of grain combine 2 and is threshed by threshing rotor 6 inside threshing housing 8. The residual straw is passed out the rearward end of rotor housing 8 where rotor 16 of beater 12 pulls the straw downward. As rotor 16 rotates, lug blades 36 and lugs 34 will catch the straw and expel it from beater 12 between rotor 16 and grate 18. Any straw obstructed by arms 31 of housing frame 30 is removed by blades 36 on the outer sections 46 of rotor 16.

As rotor housing 8 and housing frame 30 rotate, the individual housing frame members or legs 31 pass by rotor 16. Since no blades 36 are installed on the lugs 34 in center section 50 of rotor 16, center section 50 has a smaller effective diameter and does not interfere with the rotation of housing frame 30. Referring to FIGS. 2 and 3, the outer section lug blades 36 will not intersect the path of rotating housing frame 30.

This invention has several advantages. The beater allows the rotor to reach further towards the rotational axis of the rotor housing, thus enabling it to remove a greater percentage of the straw which otherwise collects on the housing frame members. The hourglass shape of the rotor gives the center section a smaller effective diameter than the two outer sections. In this configuration, the rotor does not interfere with the rotational path of the rotor housing frame even though it is effectively closer to the housing frame than the outer sections. With their longer blades, the outer sections are closer to the rotating frame legs and can therefore pull down and discharge more of the obstructed straw. The contoured grate increases the efficiency of the beater as it allows the center section of the rotor to discharge straw as readily as the two outer sections. This design discharges straw more effectively, thereby increasing the straw removal efficiency of the threshing section.

While the invention has been shown in only one of its forms, it should be apparent to those skilled in the art that it is not so limited, but is susceptible to various changes without departing from the scope of the invention.

We claim:

1. In a grain combine having a threshing rotor which rotates about a longitudinal axis to thresh grain from crop, and a crop discharge assembly which receives and discharges crop from the threshing rotor, wherein the straw discharge assembly comprises:

a beater located adjacent to a rearward end of the threshing rotor and rotatable about a transverse axis perpendicular to the longitudinal axis, the beater having a central section and two side sections, the central section having a lesser surface of revolution about the transverse axis than the two side sections; and a discharge grate mounted below and closely spaced to the beater, the grate substantially conforming to the surfaces of revolution of the central section and the two side sections of the beater to define a substantially constant clearance between the central section and the two side sections of the beater and the grate, the straw being expelled between the beater and the discharge grate.

2. The grain combine of claim 1, wherein the straw beater further comprises:

a cylindrical body;

a plurality of lug members extending radially from an outer surface of the body; and wherein the lug members in the central section protrude to a lesser radial distance than the lug members in the side sections.

3. The grain combine of claim 1, wherein the straw beater further comprises:

a cylindrical body;

a plurality of lugs extending radially from an outer surface of the body;

a plurality of lug blades attached to each lug in the side sections of the body; and wherein the lugs in the center section are free of lug blades, providing a lesser surface of revolution about the transverse axis than the side sections.

4. The grain combine of claim 1, wherein the discharge grate comprises a partially cylindrical, perforated discharge grate body with a center section and two side sections which register with the center and side sections of the beater, the center section being elevated above the two side sections.

5. In a grain combine having a threshing rotor which rotates about a longitudinal axis to thresh grain from crop, and a straw discharge assembly which receives and discharges straw from the threshing rotor, wherein the straw discharge assembly comprises:

a beater located adjacent to a rearward end of the threshing rotor and rotatable about a transverse axis perpendicular to the longitudinal axis, the beater having a central section and two side sections;

a plurality of lug members extending radially from an outer surface of the beater each having a tip;

wherein the tips of the lug members in the central section are located at lesser radial distances from the transverse axis than the lug members in the side sections, thereby defining a lesser surface of revolution for the central section than the two side sections; and a partially cylindrical, perforated discharge grate mounted below and closely spaced to the beater, the grate having a center section and two side sections which register with the center and side sections of the beater, the center section being elevated above the two side sections, the grate substantially conforming to the surface of revolution of the beater to define a substantially constant clearance between the beater and the grate, the straw being expelled between the beater and the discharge grate.

6. The grain combine of claim 5, wherein the beater further comprises:

a plurality of lug blades attached to each lug member in the side sections of the beater; and wherein the lug members in the center section are free of lug blades.

7. In a grain combine having a threshing rotor which rotates within a rotor housing, both the threshing rotor and the rotor housing rotating about a longitudinal axis to thresh grain from crop, a rearward end of the rotor housing being supported by a conical housing frame, and a straw discharge assembly which discharges straw to be discarded from the grain combine, wherein the straw discharge assembly comprises:

a cylindrical straw beater located below the housing frame, the straw beater having a center section, two side sections and a rotational axis perpendicular to the longitudinal axis;

a plurality of lug members extending radially from an outer surface of the beater in the center section and the two side sections, the lug members in the center section protruding to a lesser radial distance than the lug members in the side sections; and a discharge grate having a partially cylindrical, perforated discharge grate body with a center section and two side sections which register with the center and side sections of the beater, the center section being elevated above the two side sections so as to be spaced substantially the same distance from the lug members of the center section as the side sections of the discharge grate are to the lugs of the side sections.

8. The grain combine of claim 7, wherein the straw beater further comprises:

a plurality of lug blades attached to each lug in the side sections of the body; and wherein the lugs in the center section are free of lug blades, providing a lesser surface of revolution about the rotational axis than the side sections.

* * * * *